June 3, 1958     S. H. EDGE ET AL     2,837,177
ROTATABLE PIPE COUPLING
Filed July 22, 1954     2 Sheets-Sheet 1
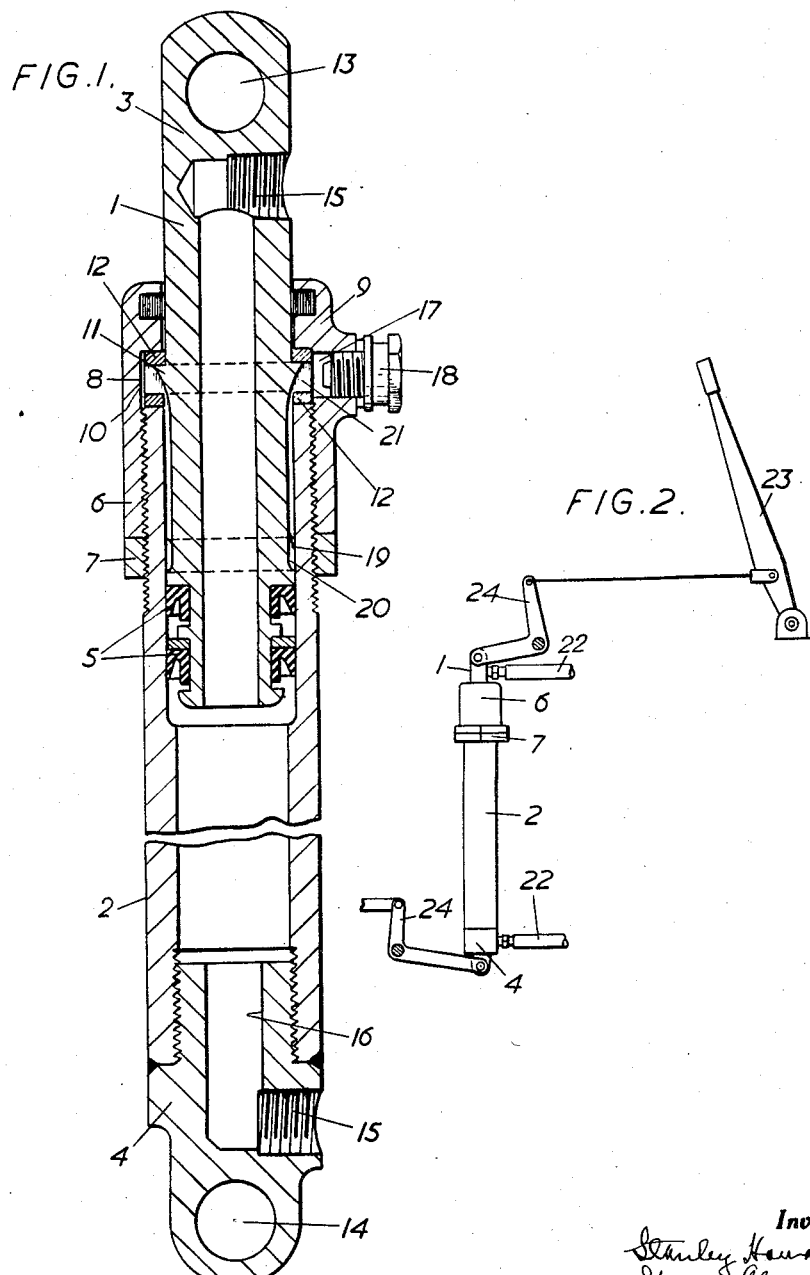

INVENTORS
STANLEY HOWARD EDGE and
GEORGE ALAN JEFFREY

United States Patent Office 2,837,177
Patented June 3, 1958

2,837,177

ROTATABLE PIPE COUPLING

Stanley Howard Edge and George Alan Jeffrey, Lincoln, England, assignors to Clayton Dewandre Company Limited, Lincoln, England, a British company Application July 22, 1954, Serial No. 445,080

Claims priority, application Great Britain July 23, 1953

6 Claims. (Cl. 188—2)

This invention relates to rotatable pipe couplings, i. e. couplings which are constructed with at least two relatively rotatable parts for connecting together two pipes which are connected to members mounted on two relatively rotatable structures. The object of the invention is to provide an improved coupling of this character.

According to the invention there is provided a rotatable pipe coupling as above defined which, in addition to providing a means for coupling the two pipes together, is also adapted to be connected into a mechanical transmission system between two elements mounted one on each of the two relatively rotatable structures, and is constructed with means for enabling a mechanical effort to be transmitted through the coupling without obstructing the relative rotation of the parts thereof.

Reference will now be made to the accompanying drawings in which

Fig. 1 is a sectional view of a preferred embodiment of the invention,

Fig. 2 is a diagrammatic illustration of one application of the invention, and

Figure 3:
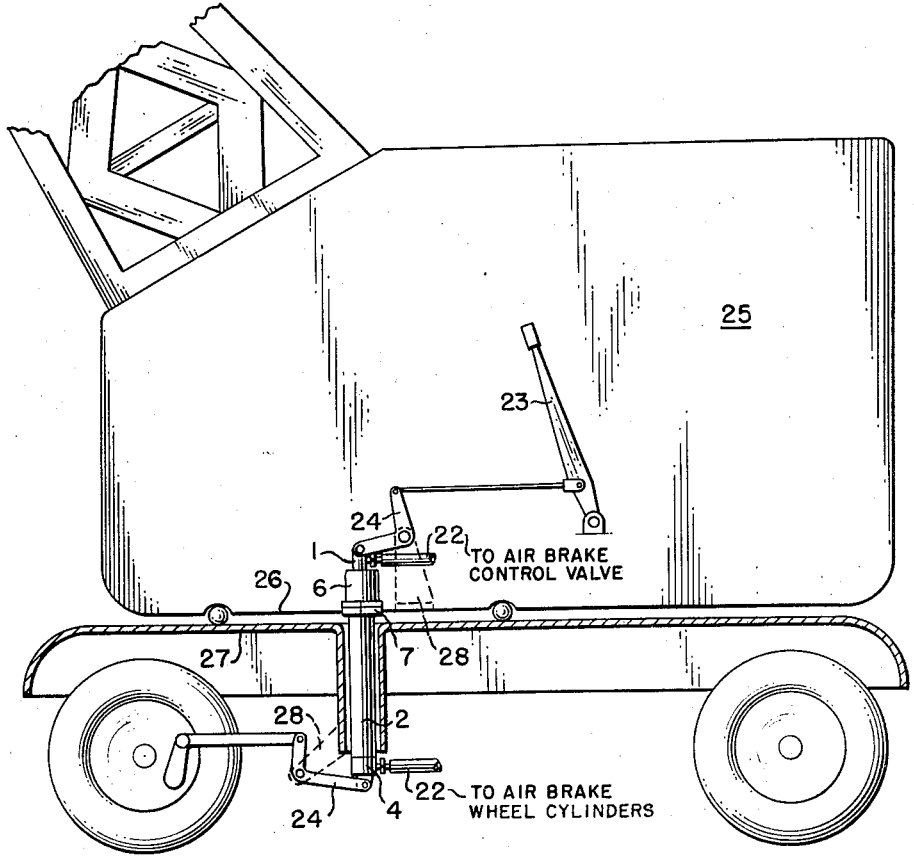
Fig. 3 is a side elevation of a traveling crane showing the invention applied thereto.

In the embodiment illustrated the coupling consists of two relatively rotatable parts 1 and 2 of substantially tubular form and each of which is open at one end and closed at the other, the part 1 being formed with an integral closure 3 and the part 2 being closed by a screw-threaded cap 4. The open end of the part 1 (hereinafter referred to as "the male part") is adapted to fit closely within the open end of the part 2 (hereinafter referred to as "the female part") and carries a pair of sealing rings 5 on a portion of reduced external diameter at its inner end in order to ensure that the fit is fluid-tight. The two parts are secured against relative axial displacement by means of a tubular coupling nut 6 which is adapted to be passed over the male part of the coupling and screwed onto the open end of the female part, and which is secured against displacement by a locking nut 7. The coupling nut is threaded over a part of its length only so as to leave an unthreaded portion 8 surrounding the male part of the coupling. At the outer end of its unthreaded portion the nut is formed with an inwardly directed flange 9, and between this flange and the rim surrounding the open end of the female part of the coupling there is left an annular space 10 in which is located a circumferential flange 11 formed on the outer surface of the male part of the coupling. On each side of this flange there is arranged a thrust bearing in the form of an anti-friction washer 12, one of the washers being adapted to act between the face on the inside of the flange 9 on the nut and the face on the adjacent side of the flange 11 on the male part of the coupling, and the other washer being adapted to act between the face on the other side of the flange 11 on the male part of the coupling and the face of the rim surrounding the open end of the female part of the coupling. These thrust bearings, in addition to permitting free relative rotational movement between the two parts of the coupling, also enable a push or pull to be transmitted mechanically through the coupling in the direction of its axis without obstructing the relative rotation of the two parts. The thrust bearings may take the form of ball-bearing races as an alternative to the anti-friction washers.

In order to enable the coupling to be readily connected into a mechanical transmission system between an element mounted on one of the aforesaid relatively rotatable structures and an element mounted on the other of said structures, the male part of the coupling is provided at its closed end with an eye 13 and the closure cap 4 of the female part of the coupling is provided with an eye 14.

Each of the two coupling parts has a port 15 which is screw-threaded to receive the end of one or the other of the two pipes which are to be coupled together. The port in the male part extends radially through the wall thereof externally of the female part and the coupling nut 6, and the port in the female part extends radially through the closure cap 4 and communicates with the interior of the coupling through an axial passage 16 in the closure cap.

In order to permit the lubrication of the thrust bearings and the contacting portions of the two parts of the coupling, the coupling nut 6 is formed with a screw-threaded aperture 17 which opens into the annular space 10 and which is normally closed by a screw-threaded plug 18, and the outer surface of the male part of the coupling is longitudinally and circumferentially grooved as indicated at 19 and 20 respectively. The longitudinal grooves 19 extend through the flange 11, at which point they are curved as shown at 21 so that the lubricant is guided into the grooves.

One application of the invention, as shown diagrammatically in Fig. 2, is to the braking system of a travelling crane in which the superstructure 25 of the crane is mounted upon a turntable 26 which is rotatable relative to the wheeled carriage or bogie 27 of the crane. In this application the coupling, which is arranged vertically through the center of the turntable, enables the brakes to be operated either by fluid-pressure or manually. In the case of fluid-pressure operation the coupling provides a means for coupling together the pipes 22 which connect the compressor (not shown) on the superstructure with the reservoir (not shown) on the carriage, or, alternatively, the pipes connecting the brake valve (not shown) on the superstructure with the brake-actuating cylinders (not shown) on the carriage. In the case of manual operation of the brakes the coupling provides a means for transmitting effort mechanically from a hand brake-operating lever 23 on the superstructure to the wheel brakes (not shown) on the carriage. For example, the two parts of the coupling can conveniently be linked to the lever 23 and the brakes through the intermediary of bell-crank levers 24, pivotally supported by brackets 28 mounted one on the turntable and one on the carriage of the crane. The coupling is thus vertically movable as a unit, being supported by the bell-crank levers 24, and is capable of transmitting movement from the hand lever 23 to the wheel brakes regardless of the position of the turntable relatively to the carriage.

We claim:

1. A combined fluid and mechanical transmission coupling between relatively rotatable structures comprising two coaxial relatively rotatable coupling parts having a fluid tight fit between them and having means for transmitting mechanical forces axially through the coupling, pipes on said structures connected respectively to said parts of the coupling, and mechanical transmission elements mounted on the respective structures and connected respectively to said parts of the coupling and supporting the coupling parts for relative rotation on an axis coincident with the axis of relative rotation of said structures and for reciprocation of the coupling axially for transmission of mechanical forces between said structures.

2. A coupling for connecting fluid conducting pipes and elements of a mechanical transmission system between relatively rotatable structures, comprising coupling parts fitted together for relative rotation and having means for transmission of mechanical forces axially between the coupling parts, means on the relatively rotatable structures and connected to the respective parts of the coupling for movements of the coupling coaxially with the axis of relative rotation of said structures, means on one of said structures for applying mechanical force to the coupling to impart reciprocation thereto, and means on the other structure to receive mechanical forces transmitted thereto through the coupling.

3. A rotatable coupling for connecting pipes and elements of a mechanical transmission system mounted respectively on relatively rotatable structures, comprising two coupling parts fitted together for relative rotation, means for supporting said parts on the respective relatively rotatable structures for rotation therewith on an axis coincident with the axis of relative rotation of said structures and for reciprocation on said axis, said parts having means for connecting them respectively with the pipes on the relatively rotatable structures, and means on one of said structures for applying forces to the coupling to reciprocate it for transmission to the other of said structures.

4. A coupling for connecting fluid conducting pipes and elements of a mechanical transmission system between relatively rotatable structures, comprising coupling parts connected for relative rotation and having fluid tight fit between them and means for transmission of mechanical forces between said parts axially of the coupling, eyes fixed to the remote ends of the coupling parts, a pair of levers mounted respectively on the relatively rotatable structures and connected to the respective eyes on the coupling parts for suspending the coupling for longitudinal reciprocation for transmission of mechanical forces between the relatively rotatable structures, and means for connecting the coupling parts to the pipes on the respective rotatable structures.

5. A dual coupling for connecting fluid pipes and elements of a mechanical transmission system mounted respectively on a wheeled carriage having a turntable thereon and a superstructure mounted on the turntable for rotation relatively to the carriage, comprising relatively rotatable coupling parts having a fluid tight fit between them and means for transmitting mechanical forces axially between said parts, braking means and brake fluid operating pipes on the wheeled carriage and a brake controlling member and brake fluid controlling pipes on the superstructure, said fluid operating and controlling pipes being connected respectively to said parts of the coupling, and means supporting the parts of the coupling for relative rotation on an axis coincident with the axis of relative rotation of the wheeled carriage and superstructure and connected to said brake controlling member for reciprocation of the coupling on said axis for transmission of mechanical forces between said carriage and superstructure.

6. A rotatable coupling for coupling pipes and elements of a mechanical transmission system mounted on relatively rotatable structures, comprising two coupling parts fitted together for relative rotation, and a screw-threaded union member holding said parts together, each of said parts having a port in its side for connection to one of the pipes to be coupled and being provided with means at its end for connecting the coupling to one of the elements of the mechanical transmission system, and the two coupling parts and the union member being formed with axially opposed surfaces, and thrust bearings through which said surfaces interact to transmit mechanical effort in an axial direction through the coupling as part of said mechanical transmission system while permitting relative rotation of the coupling parts, said screw-threaded union member being provided with a screw-threaded lubricant supply aperture which communicates with said thrust bearings and is adapted to receive a closure plug, and one of said coupling parts fitting within the other and having a flange thereon which forms two of said opposed surfaces, and the outer surface of the inner coupling part being provided with longitudinal and circumferential grooves which communicate with said lubricant supply aperture, the longitudinal grooves extending into said flange on the inner part of the coupling.

References Cited in the file of this patent

UNITED STATES PATENTS

| 1,133,295 | Layne | Mar. 30, 1915 |
| 1,621,980 | Goodman | Mar. 22, 1927 |
| 2,459,981 | Warren | Jan. 25, 1947 |
| 2,518,216 | Barker | Aug. 8, 1950 |
| 2,532,669 | Jones | Dec. 5, 1950 |
| 2,603,509 | Eskin | July 15, 1952 |
| 2,701,146 | Warren | Feb. 1, 1955 |